OR 3,612,641

[redacted] [redacted]

T 3039D ✓
X 3045Y ✓

United States Patent

[11] 3,612,641

[72] Inventor Charles Cecil Eaglesfield
Harlow, England

[21] Appl. No. 872,261
[22] Filed Oct. 29, 1969
[45] Patented Oct. 12, 1971
[73] Assignee International Standard Electric Corporation
New York, N.Y.
[32] Priority Jan. 23, 1969
[33] Great Britain
[31] 3812/69

[54] HOLOGRAPHIC DATA STORAGE WITH AN ORTHOGONALLY CODED REFERENCE BEAM

3 Claims, 7 Drawing Figs.

[52] U.S. Cl. .......... 350/3.5, 250/219 R, 340/173 LT, 350/160
[51] Int. Cl. .......... G02b 27/00, G11c 11/42
[50] Field of Search .......... 350/3.5, 160, 150; 340/173 LT, 173 SS, 174.1 MO; 250/216, 219 R, 219 FR, 219 D

[56] References Cited

UNITED STATES PATENTS

| | | | |
|---|---|---|---|
| 3,484,147 | 12/1969 | Collier .......... | 350/3.5 |
| 3,517,200 | 6/1970 | Kalman .......... | 250/216 |

OTHER REFERENCES

Collier, et al., Applied Optics, Vol. 6, No. 6, June 1967 pp. 1091–1095 (copy in 350/3.5)

La Macchia et al., Applied Optics, Vol. 7, No. 1, Jan. 1968, pp. 91–94 (copy in 350/3.5)

*Primary Examiner*—David Schonberg
*Assistant Examiner*—Ronald J. Stern
*Attorneys*—C. Cornell Remsen, Jr., Walter J. Baum, Paul W. Hemminger, Percy P. Lantzy, Philip M. Bolton and Charles L. Johnson, Jr.

ABSTRACT: A system for holographic data storage in which a large number of holograms are superimposed on a single plate by an array of electro-optic elements placed in the reference beam. The array is operated during the recording of the holograms of data 'pages' so that the array is able to reconstruct an image of any one of the pages and the component images of every other page interfere with each other so that only the desired page is reconstructed.

Inventor
CHARLES C. EAGLESFIELD
By [signature]
Attorney

Inventor
CHARLES C. EAGLESFIELD
By [signature]
Attorney

Inventor
CHARLES C. EAGLESFIELD
By [signature]
Attorney

Inventor
CHARLES C. EAGLESFIELD
By [signature]
Attorney

Inventor
CHARLES C. EAGLESFIELD
By [signature]
Attorney

HOLOGRAPHIC DATA STORAGE WITH AN ORTHOGONALLY CODED REFERENCE BEAM

BACKGROUND OF THE INVENTION

This invention relates to a method of image formation and apparatus therefor in which different images can be formed at the same place without recourse either to the use of a separate imaging system for each image or to the use of moving parts. Imaging apparatus of this type has particular but not exclusive application in the field of the photographic storage of data.

Data can conveniently be stored in binary form in a pattern frame or checkboard elemental areas of which may be transparent or opaque or may be light areas or dark areas. Each elemental area contains one bit of stored information according to whether it is transparent or opaque or alternatively according to whether it is light or dark. Data can be extracted from such a store by forming an image of the pattern frame on a data readout array of photosensors arranged so that the image of each elemental area falls on a separate photosensor.

Such a data store has a bit storage capacity equal to the number of photosensors in the array but this capacity can be increased by having a plurality of pattern frames each one of which can be separately imaged on the data readout array.

Obviously it is at least in principle possible to employ a separate imaging system for each pattern frame, but this is both difficult and expensive to realize in practice if a large number of pattern frames are involved. The alternative approach of using a single imaging system together with moving parts to produce the required image in the required position involves an access time which is far too long for the majority of computer applications. A third approach relies on the use of holography. It is a property of holography that if a hologram is recorded in a photographic plate with the aid of a particular geometry of reference beam, and then the object is replaced with a different object in such a way that this second object occupies the position formerly occupied by the first object, and then a further hologram is recorded the same photographic plate with the aid of a different geometry of reference beam, then the first geometry of reference beam can subsequently be used to reconstruct a virtual image of the first object, and the second geometry of reference beam can be used to reconstruct, in the same position as the first image, an image of the second object. Therefore a single imaging system can be used to produce at a particular position a real image of either of these objects according to whichever geometry of reference beam is employed to illuminate the photographic plate, and it does not matter whether or not the two holograms overlap. The principle can obviously be extended to cover the formation at a particular position of many separate images by the one imaging system.

One way in which this principle can be applied to data storage includes the use of an array of apertures and a deflection system which can be used to deflect the reference beam so that it passes through any particular one of these apertures. With an array of $n$ apertures $n$ holograms can be superimposed on a single plate in such a way that their images can individually be reconstructed. This obtains when the recording of each hologram is made while the reference beam is being transmitted through a different one of the apertures. However, the only known purely electrical means for achieving such light deflection are expensive and cumbersome; mechanical means, on the other hand, are too slow for most applications of data storage.

This invention discloses a system in which the need for a deflecting system is circumvented and in its stead use is made of an array of electro-optic elements placed so that the reference beam, employed either for recording or reconstruction, is divided into components which are simultaneously transmitted through every member of the array. With such an array a number of holograms of different objects can be superimposed on the same photographic plate in such a way as to permit the individual reconstruction of the image of any one of the objects. For this purpose the array is operated in such a manner, during the recording of the holograms of the objects, that in the reconstruction of an image of any one of these objects there exists a particular phase relationship between the components of the reconstructing beam such that the component images of every other object interfere with each other so that only the one object is reconstructed.

SUMMARY OF THE INVENTION

According to the invention there is provided apparatus including a light source adapted to provide two phase linked beams of monochromatic light, an object holder, a photographic plate holder, and an electro-optic phase plate array which array includes a plurality of apertures each of which contains an electro-optic element through which light may be transmitted along an optical path length which may be varied by the application of an electric field between a first and a second electrode attached to that element, which light source, object holder, photographic plate holder, and electro-optic phase plate are held in spaced relationship such that a hologram can be recorded in a photographic plate held in the photographic plate holder of an object held in the object holder and illuminated by one of said two phase linked beams of monochromatic light, said other beam being transmitted through the apertures of the electro-optic phase plate array to provide the reference beam required for the recording of the hologram.

The invention also provides a method of image formation by reconstruction from holograms wherein a series of holograms of different objects are recorded in a photographic plate using a composite reference beam having phase linked components whose phase interrelationship can be regulated by means of electrical signals, the hologram of each object being recorded with the same relative disposition of object, photographic plate, and composite reference beam, but with a unique interrelationship between the components of the reference beam chosen such that when the same phase interrelationship is employed for reconstructing an image of this object from the recorded holograms no image of any of the other objects is reconstructed because the phase interrelationship is such that for each of the holograms of these other objects the component images reconstructed with each of the component beams of the composite reference beam together destructively interfere with one another to cancel each other out.

In its application to data storage the invention provides a method of data storage of the type in which each bit of stored data is represented by transparency or opaqueness or by lightness or darkness at a particular location in one of a plurality of pattern frames and of the type in which data readout is effected by forming on an array of photosensors the image of any one of the pattern frames wherein the data is stored in a single photographic plate in the form of holograms of the pattern frames which holograms are recorded using a composite reference beam having phase linked components whose phase interrelationship can be regulated by means of electrical signals, the hologram of each pattern frame being recorded with the same relative disposition of pattern frame, photographic plate, and composite reference beam, but with a unique phase interrelationship between the components of the reference beam chosen such that when the same phase interrelationship is employed for reconstructing on the array of photosensors an image of this pattern frame from the recorded holograms no image of any of the other pattern frames is reconstructed thereon because the phase interrelationship is such that for each of the holograms of these other pattern frames the component images reconstructed with each of the component beams of the reference beam together destructively interfere with one another to cancel each other out, whereby the image of any chosen one of the pattern frames can be formed on the array of photosensors by suitable choice of electric signal for the regulation of the phase interrelationship of the components of the reference beam.

BRIEF DESCRIPTION OF THE DRAWINGS

The foregoing and other features of the invention will become more apparent and the invention itself will be best understood by reference to the following description taken in connection with the accompanying drawings in which.

DESCRIPTION OF THE PREFERRED EMBODIMENT

Figure 1A:
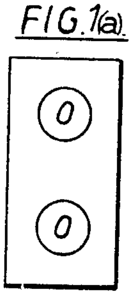
FIGS. 1*a* and 1*b* depict two possible states of a two-apertured phase plate array.

Before giving a description of the apparatus itself a description is given of the way in which the principles of holography are employed in this invention.

This invention applies the principles of interference between reconstructed holographic images to produce a system in which the holograms of a number of different objects are recorded in one photographic plate under such conditions that an image can be reconstructed of any one of the objects by means of a composite reference beam whose components have a phase interrelationship of such a character as to cause the cancellation by destructive interference of all the images of all the other objects. It is preferred to use for this purpose a composite reference beam whose components have a phase relationship which can be regulated by means of electric signals. Such a beam can be produced by illuminating with a single beam of light an electro-optic phase plate array consisting of an array of apertures each of which contains an electro-optic element through which the light is transmitted along a path whose optical path distance can be altered by means of an electric field produced in the element by an electric signal applied to electrodes attached to the element. In this way each aperture produces a component of the reference beam whose phase relationship with reference to the other components can be altered by means of an electric potential across its electrodes.

When an image is reconstructed from a hologram the phase relationship between component parts of the image is the same as that of the light emanating from the object when it was illuminated during the recording of the hologram. These phases also bear a definite phase relationship with that of the reference beam, so that the phase relationship existing between the reference beam and the light illuminating the object when the hologram is recorded determines the phase relationship between any part of the reconstructed image and the reference beam. Therefore if two holograms are made of the same object under the same conditions of illumination and relative disposition of object and hologram recording plate, but each recorded with a different spatially distinct reference beam, and then if the two images of the object are simultaneously reconstructed from these holograms, the two images so produced will interfere with each other.

In recording two such holograms there will in general be a phase difference between each of the reference beams and the light illuminating the object. The expression "the phase relationship of these two reference beams when used for recording the holograms" is defined to mean the difference in phase between these two phase differences. If the two holograms are recorded simultaneously this phase relationship becomes simply the phase difference between the two beams, but this definition is such as to provide the expression with meaning even when the holograms are independently recorded at different times.

With this definition of phase relationship it is possible to amplify the foregoing statement regarding interference of reconstructed images. If the phase relationship between the two reference beams is the same for reconstruction as it was for recording the two holograms the images will interfere constructively, but if there is a difference of $\pi$ between these phase relationships the images will interfere destructively.

The mode in which such a phase plate array is employed can be demonstrated at first by reference to an array consisting of only two apertures, $A_1$ and $A_2$, which are of equal size. With this array the holograms of two objects, $O_1$ and $0_2$, can be stored in such a way that images of the objects can be individually reconstructed one at a time. The hologram of $O_1$ is recorded with no electric field across either of the apertures, and then $0_1$ is replaced with $0_2$ whose hologram is recorded while there is an electric field set up across $A_2$ which is sufficient to have changed its optical path length by half a wavelength thereby introducing a phase difference of $\pi$. If, after removing the objects, the phase plate array is used for reconstructing images while it is in the same state as it was for recording $0_1$, that is to say with no electric field across either aperture, then the image of $0_1$ reconstructed with the component of the reference beam derived from aperture $A_1$ will interfere constructively with that reconstructed with the component of the reference beam derived from aperture $A_2$, but the two images of $0_2$ will interfere destructively, and because the two component images are of equal amplitude, they will cancel out each other. Similarly if the phase plate is used for reconstructing images while it is in the same state as it was for recording $0_2$ then an image of $0_2$ will be reconstructed but not of $0_1$.

Figure 1B:
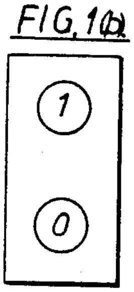

FIG. 1*a* depicts the phase plate array in the state required both for the recording of the hologram of object $0_1$ and for reconstructing an image of $0_1$ while FIG. 1*b* shows the corresponding state for object $0_2$. The nomenclature employed in these and succeeding Figures relating to the possible states of phase plate arrays is that an aperture is represented by a 0 if it is one across which there is either no electric field, or a field of such magnitude as to produce no phase change with respect to that which would exist in the absence of an electric field, whereas it is represented by a 1 if the electric field is of such a magnitude as to produce a phase change of $\pi$ with respect to that which would exist in the absence of an electric field.

It has been shown that the two states depicted in FIGS. 1*a* and *b* are such as to enable holograms to be formed of two objects whose images can then be reconstructed independently of one another. Any two states having this property will hereinafter be referred to as orthogonal states. From the foregoing discussion it can be seen that the condition for orthogonality of states of a multiapertured phase plate array having apertures of equal size is that two states are only orthogonal if exactly half the total number of apertures in the array are in the same condition irrespective of which of the two states the array is in.

Figure 2:
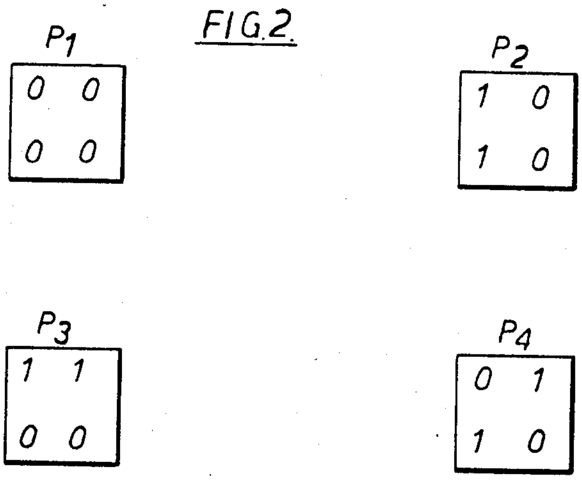
FIGS. 2 and 3 depict respectively four possible states of a four-apertured phase plate array and 16 possible states of a 16 apertured array.
Figure 3:
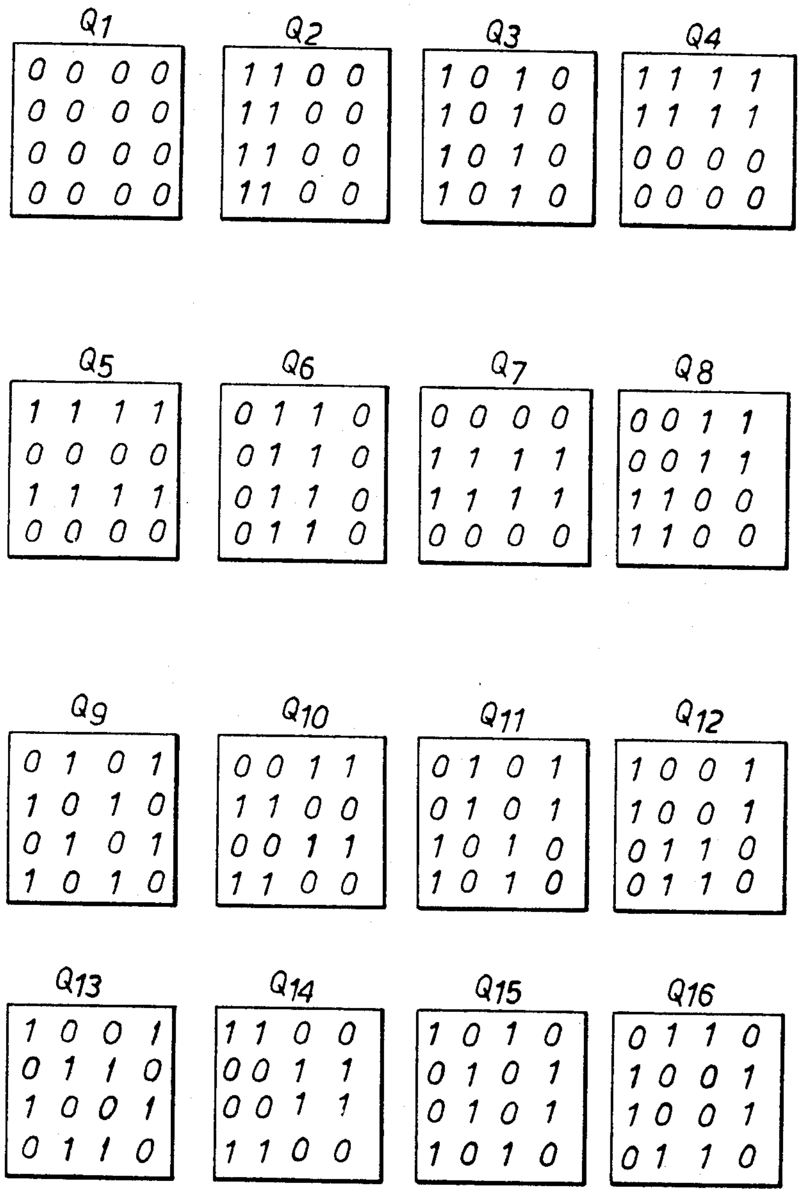

It can be shown by mathematical analysis that the number of states forming a complete orthogonal set, a complete orthogonal set being defined to be a set containing the largest number of states which can together be mutually orthogonal with one another, cannot exceed the number of apertures in the array. It can also be shown that only when the number of apertures in the array is equal to $2^n$ (where $n$ is an integer), is the number of states forming a complete orthogonal set equal to the number of apertures. FIGS. 2 and 3 depict respectively a complete orthogonal set of states for a four-, and a 16-, apertured phase-plate array.

From FIGS. 2 and 3 it can be seen that the members of a complete set have certain properties of interrelationship which can be expressed in terms of addition of individual members, addition in this context being defined such that the state C produced by the addition of states A and B is the state which would be produced by the array if the electric field pattern required to produce state A is added to the electric field pattern required to produce state B. This definition requires that if a particular aperture in state A is described by a 0 and also in state B by a 0, then no phase change is introduced by the addition, and hence the corresponding aperture of state C is described by a 0. If the aperture was described by a 1 by one or other but not both of the states A and B, the phase change introduced by the addition is $\pi$, and so the corresponding aperture of state C is described by a 1. Finally if the aperture was described by a 1 in both of the states A and B the phase change introduced by the addition is $2\pi$, which is equivalent to no phase change, and hence the corresponding aperture of state C is described by a 0.

Figure 4:
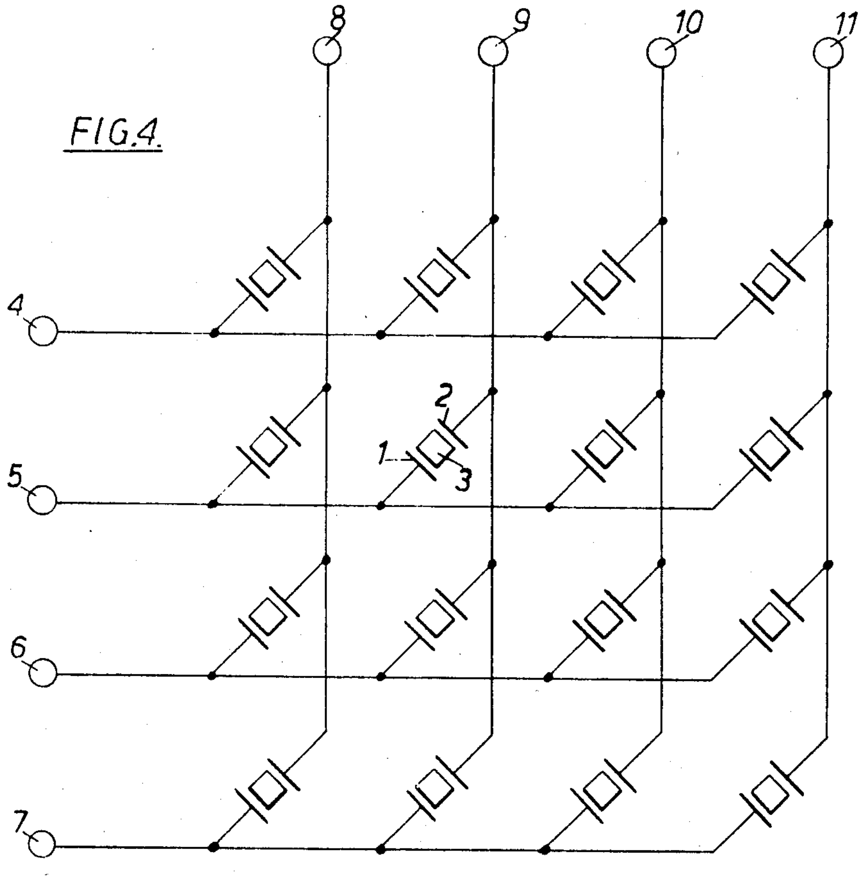
FIGS. 4 and 5 are schematic representations of the interconnection of electrodes of respectively 16 apertured and $(r\times s)$ -apertured electro-optic phase plate arrays.

Using this definition of the addition of states it can be verified that state $P_4$ is formed by the addition of states $P_2$ and $P_3$, similarly $Q_6=Q_2+Q_3$
$Q_7=Q_4+Q_5$
$Q_8=Q_2+Q_4$
$Q_9=Q_3+Q_5$
$Q_{10}=Q_2+Q_5$
$Q_{11}=Q_3+Q_4$
$Q_{12}=Q_2+Q_3+Q_4$
$Q_{13}=Q_2+Q_3+Q_5$
$Q_{14}=Q_2+Q_4+Q_5$
$Q_{15}=Q_3+Q_4+Q_5$
$Q_{16}=Q_2+Q_3+Q_4+Q_5$ These relations together with the facts that all the rows of $Q_2$ are identical, all the rows of $Q_3$ are identical, all the columns of $Q_4$ are identical and all the columns of $Q_5$ are identical, demonstrate that every one of these states can be set up using a phase plate array with electrodes connected together according to row and column as depicted schematically in FIG. 4.

FIG. 4 depicts an array of 16 electro-optic elements 3 each of which is situated between a pair of electrodes 1 and 2. The electrodes 1 are connected together in rows and to row terminals 4, 5, 6 and 7 while the electrodes 2 are connected together in columns and to column terminals 8, 9, 10 and 11. Any one of the 16 states can be set up by applying appropriate potentials in the correct combination to the eight terminals. For example, if a voltage V across an aperture is sufficient to produce a phase change of $\pi$, $Q_{13}$ is set up by applying a potential of V to terminals 4 and 6 and a potential of $-V$ to terminals 9 and 10, while earthing the remainder of the terminals.

There is no particular difficulty in deriving complete orthogonal sets for larger numbered arrays because examination of the properties of symmetry displayed by the complete orthogonal sets of FIGS. 2 and 3 reveals that complete orthogonal sets having similar symmetries exist for any array of $2^n$ apertures which are arranged in square or rectangular array. It was demonstrated above that for a 16 apertured array a complete orthogonal set of states can be constructed from five basic states, from the state $Q_1$ described entirely by 0*s*, the states $Q_2$ and $Q_3$ in which each row of a state is the same, and the states $Q_4$ and $Q_5$ in which each column of a state is the same. All the remaining states of the complete orthogonal set can be formed by the addition of the basic states in every possible combination. A complete orthogonal set can be constructed for an array composed of $2^r$ columns and $2^s$ rows in an analogous way using $1+r+s$ basic states. The basic states in this case are the state described entirely by 0*s*, *r* states in which each row of a state is the same and *s* states in which each column of a state is the same. Each row of each of the *r* states is described by equal numbers of 0*s* and 1*s*. The first of the *r* states is a state in which the members of one-half of each row are described by 1*s*, The second is one in which the member of alternate quarters of each row are described by the 1*s*, the third in which alternate eights, and so on, until the $r^{th}$ state which is a state in which alternate members of each row are described by 1*s*. The *s* states are similarly formed, each column being described by equal numbers of 0*s* and 1*s*. The first of the *s*states is a state in which the members of one-half of each column are described by 1*s*, and so on until the $s^{th}$ state which is the state in which alternate members of each column are described by 1*s*. A complete orthogonal set of $2^{(r+s)}$ states can be constructed by addition from these basic states and this set will have the property that an electro-optic phase plate array of $2^r$ columns and $2^s$ rows can be constructed with electrodes connected together according to columns and rows as depicted schematically in FIG. 5 so that any one of the $2^{(r+s)}$ states can be set up by applying appropriate potentials in the correct combination to the $r^+s$ terminals T.

Figure 5:
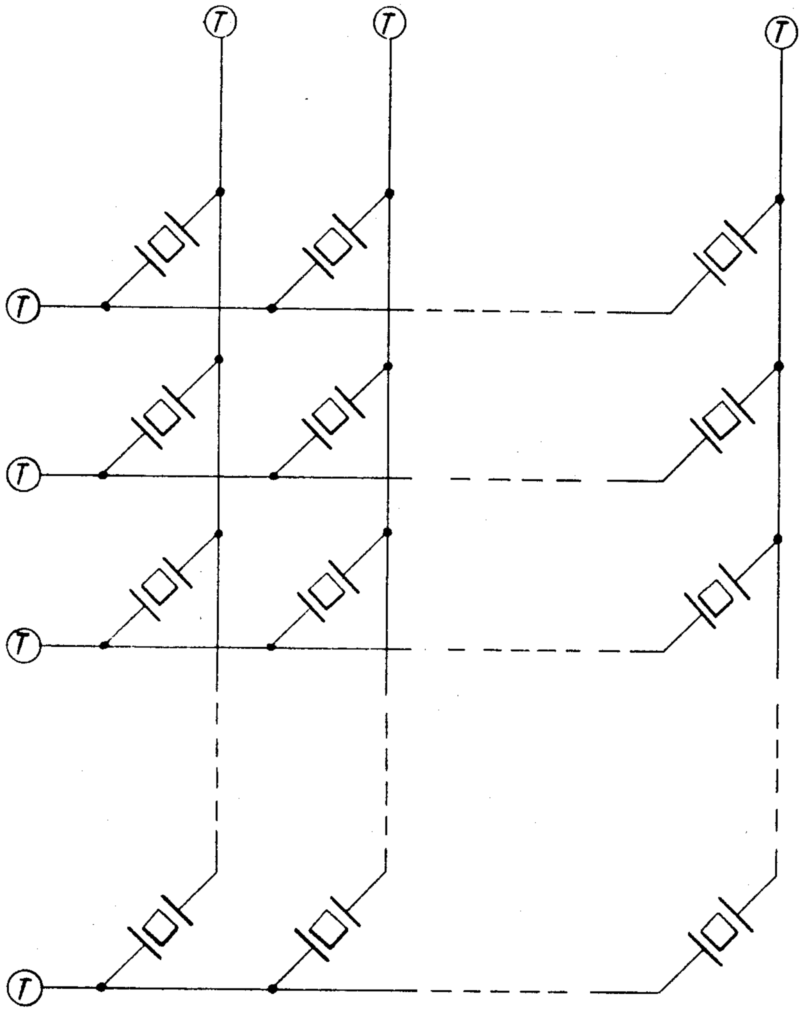
Figure 6:
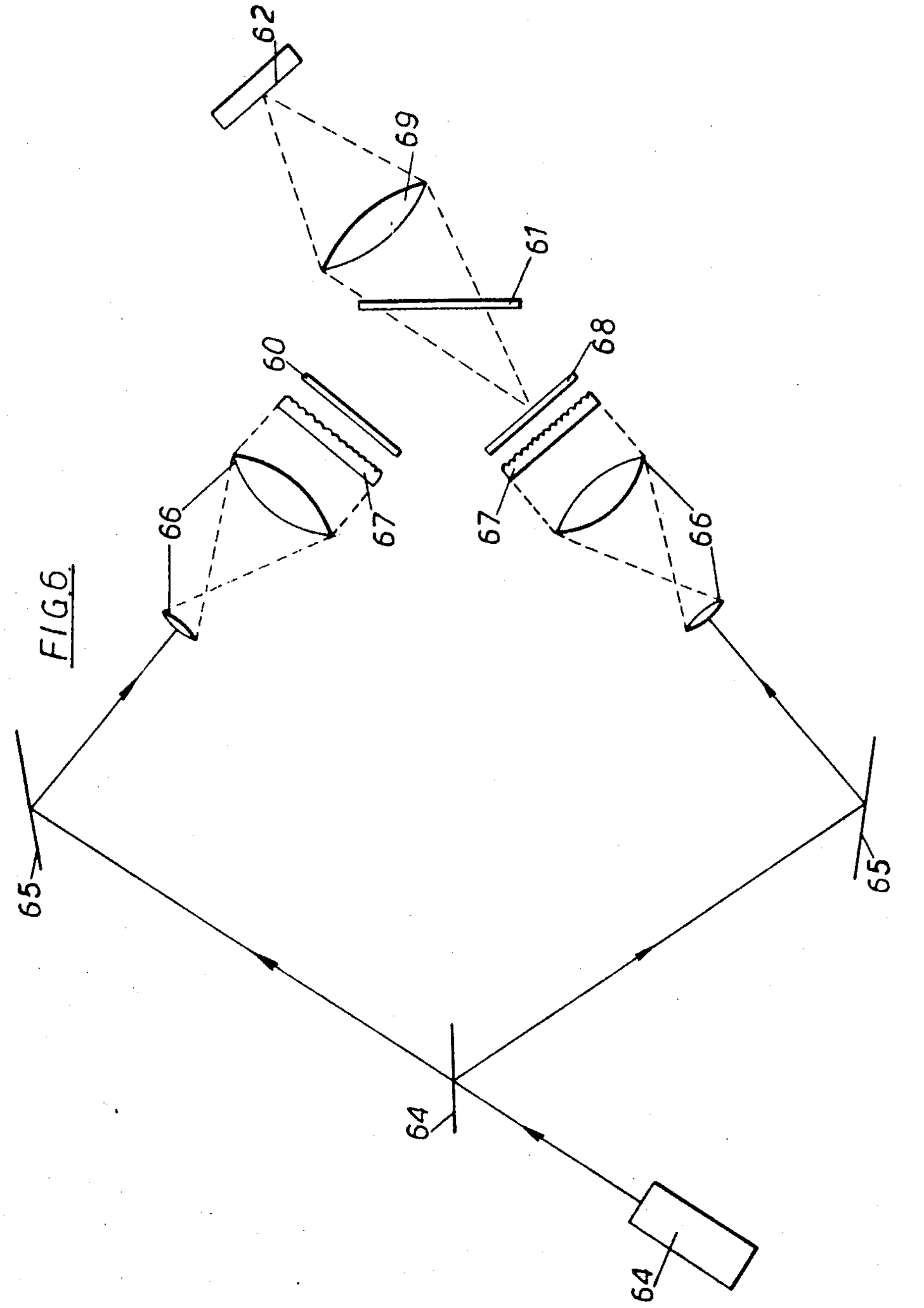
FIG. 6 is a diagram of a data storage apparatus.

FIG. 6 is a diagram of a data storage system employing the electro-optic phase plate array depicted in FIG. 5. With the aid of this plate, indicated at 60, the holograms of $2^{r+s}$ data pattern frames can be recorded in a photographic plate 61. After recording the holograms the plate 60 can be used to reconstruct from the photographic plate 61 an image of any one of the data pattern frames on an array of photosensors 62.

For recording the holograms the light from a laser 63 is directed onto a beam splitter 64 and from there by mirrors 65 to lens systems 66 which broaden the beams of light which then fall on fly's eye lenses 67. One of the fly's eye lenses concentrates the light of one beam into the apertures of the electro-optic phase plate array 60, while the other fly's eye lens concentrates the light of the other beam into an array of spots on a data pattern frame 68. These spots are arranged to coincide with areas of opaqueness or transparency of the pattern frame by which the data stored in the frame is represented. The photographic plate 61 is placed in the path of the light transmitted by the pattern frame where it overlaps the path of the composite reference beam derived from the phase plate array 60.

Each pattern frame is placed in the same position for the recording of its hologram, but with the phase plate array in a different one of its orthogonal states.

For data read out the light beam directed towards the data pattern frame is obstructed and a lens 69 is placed in position to form a real reconstructed image on the array of photosensors 62 of any one of the pattern frames.

Instead of recording the holograms of pattern frames by means of light transmitted through them pattern frames can be used which are entirely opaque but made up of areas of lightness and darkness in which case the photographic plate 61 is placed to receive some of the light diffused from these areas when illuminated by light from the fly's eye lens 67.

If the electro-optic elements of the phase plate array are of the type requiring an electric field along the direction of propagation of the light, the individual elements can be constructed from a single electro-optic crystal sheet having mesh electrodes or transparent electrodes deposited in pairs on opposite sides of the sheet in the form of an array.

I claim:

1. In a system for holographically recording a plurality of object transparencies on one area of a photographic plate comprising:

a light source;

means for forming light from said source into an object beam and a reference beam;

means for sequentially positioning each object transparency at a fixed location; and a photographic plate holder and means for modulating the reference beam so as to provide a uniquely coded reference beam for each object transparency, the improvement wherein said means for modulating the reference beam consists of a plurality of equally sized electro-optic phase plates arranged in a planar array, each electro-optic phase plate providing one of two phase shifts, wherein one of said two phase shifts is a uniform $\pi$ phase shift with respect to the other phase shift, the phase shift produced by said plate being selectable in response to an electric signal, and the total number of phase plates being an integral power of two, said array of phase plates being operated to be in one of a set of mutually orthogonal states for each object transparency recorded, each array state being such that exactly half the total number of phase plates produce the same phase shift and such that each plate produces a phase shift which is equal to the sum of the phase shifts produced by that plate in any two other states, whereby upon reconstruction all images other than the desired one destructively interfere.

2. The system according to claim 1 wherein said electro-optic phase plate array includes a plurality of electro-optic elements, each having first and second electrodes attached, wherein said elements are arranged in a square array of rows and columns, and wherein for every row and column the first electrodes of each member of a row of elements are connected to a common terminal associated with that row, and the second electrodes of each member of a column of elements are connected to a common terminal associated with that column.

3. A method for holographically recording a plurality of object transparencies on one area of a photographic plate comprising the steps of:

forming from a light source an object beam and a reference beam;

sequentially positioning each object transparency at a fixed location; and modulating the reference beam so as to provide a uniquely coded reference beam for each object transparency, wherein said modulating the reference beam step includes arranging a plurality of equally sized electro-optic phase plates in a planar array, providing each electro-optic phase plate with one of two phase shifts, wherein one of said two phase shifts is a uniform $\pi$ phase shift with respect to the other phase shift, the phase shift produced by said plate being selectable in response to an electric signal with the total number of phase plates being an integral power of two, and operating said array of phase plates to be in one of a set of mutually orthogonal states for each object transparency recorded, each array state being such that exactly half the total number of phase plates produce the same phase shift and such that each plate produces a phase shift which is equal to the sum of the phase shifts produced by that plate in any two other states, whereby upon reconstruction all images other than the desired one destructively interfere.